(12) United States Patent
Vaskovic

(10) Patent No.: US 7,417,552 B1
(45) Date of Patent: Aug. 26, 2008

(54) FLOOD ALARM

(76) Inventor: Milan Vaskovic, 614 S. Cass Ave., Westmont, IL (US) 60559

( * ) Notice: Subject to any disclaimer, the term of this patent is extended or adjusted under 35 U.S.C. 154(b) by 261 days.

(21) Appl. No.: 11/331,898

(22) Filed: Jan. 17, 2006

(51) Int. Cl.
*G08B 21/00* (2006.01)

(52) U.S. Cl. .................. 340/616; 340/620; 340/621; 340/623; 340/624; 340/618; 340/603; 340/619; 248/127; 248/152; 248/346.01; 248/458

(58) Field of Classification Search .......... 340/616, 340/620, 621, 623, 624, 618, 603, 619; 248/127, 248/152, 346.01, 548
See application file for complete search history.

(56) References Cited

U.S. PATENT DOCUMENTS

| 4,757,305 | A | * | 7/1988 | Peso | 340/624 |
| 5,283,569 | A | * | 2/1994 | Nelson | 340/623 |
| 5,367,907 | A | * | 11/1994 | Elfverson | 73/319 |
| 2003/0145371 | A1 | * | 8/2003 | Ghertner et al. | 4/427 |
| 2005/0099311 | A1 | * | 5/2005 | Eskins | 340/616 |
| 2005/0281679 | A1 | * | 12/2005 | Niedermeyer | 417/36 |

* cited by examiner

*Primary Examiner*—Tai T Nguyen

(57) ABSTRACT

A flood alarm is disclosed. In an illustrative embodiment, the flood alarm includes a float assembly and a telephone system interface module connected to the float assembly. A method of indicating a flood in a structure is also disclosed.

5 Claims, 4 Drawing Sheets

FLOOD ALARM

FIELD

The present invention relates to flood alarm systems. More particularly, the present invention relates to a flood alarm which is capable of notifying a person by telephone to the presence of a flood.

BACKGROUND

In many structures, it is common to provide a sump at the lowest point in the structure to collect water. A pump removes water from the sump, thus preventing flooding of the structure. Sometimes, however, the pump fails, thereby presenting a flood risk.

SUMMARY

The present invention is generally directed to a flood alarm. In an illustrative embodiment, the flood alarm includes a float assembly and a telephone system interface module connected to the float assembly.

The present invention is further directed to a method of indicating a flood in a structure. The method includes providing a sump pit in the structure, providing a float assembly in the sump pit, connecting a telephone system interface module to the float assembly, storing at least one telephone number in the telephone system interface module and transmitting an activation signal from the float assembly to the telephone system interface module in the event of rising water in the sump pit, and dialing the at least one telephone number.

BRIEF DESCRIPTION OF THE DRAWINGS

The invention will now be described, by way of example, with reference to the accompanying drawings, in which.

DETAILED DESCRIPTION

Figure 1:
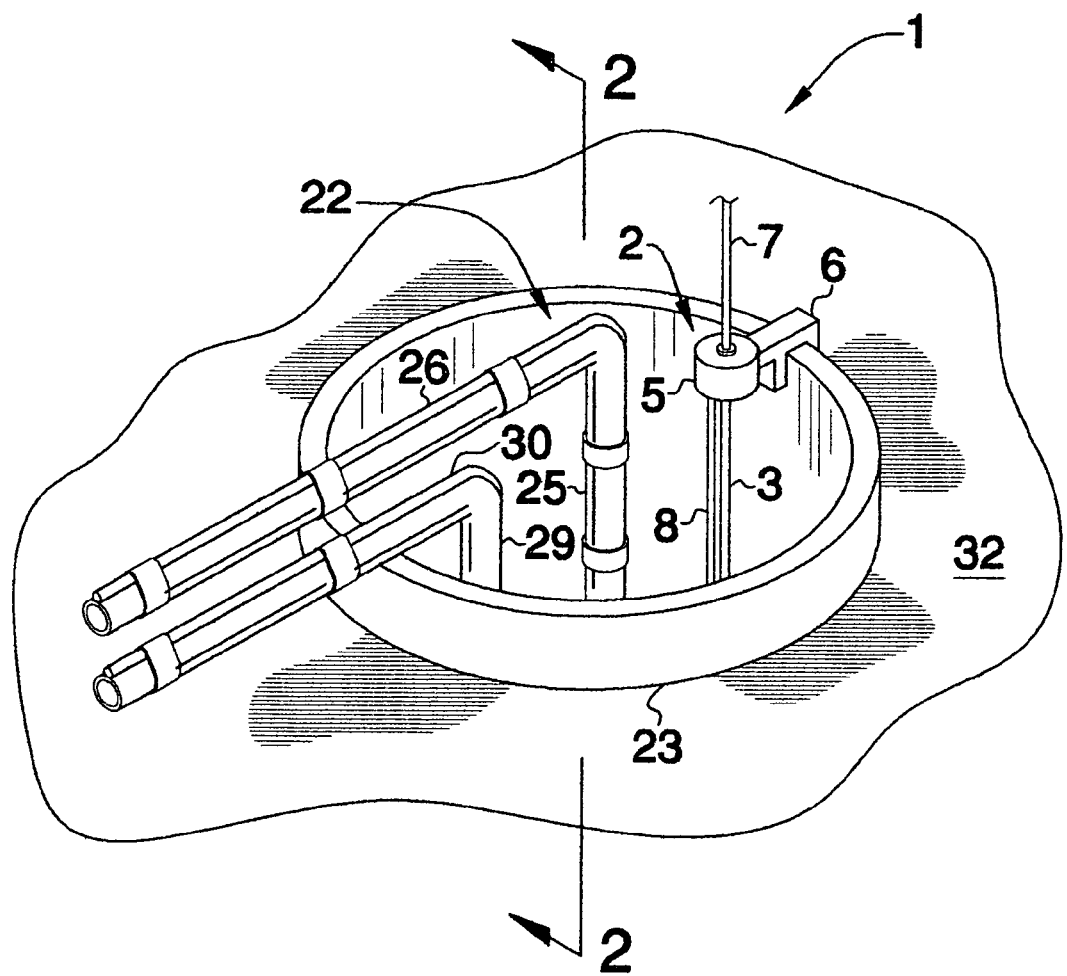
FIG. 1 is a top perspective view of a sump pit, with a float assembly element of an illustrative embodiment of a flood alarm provided in the sump pit.
Figure 2:
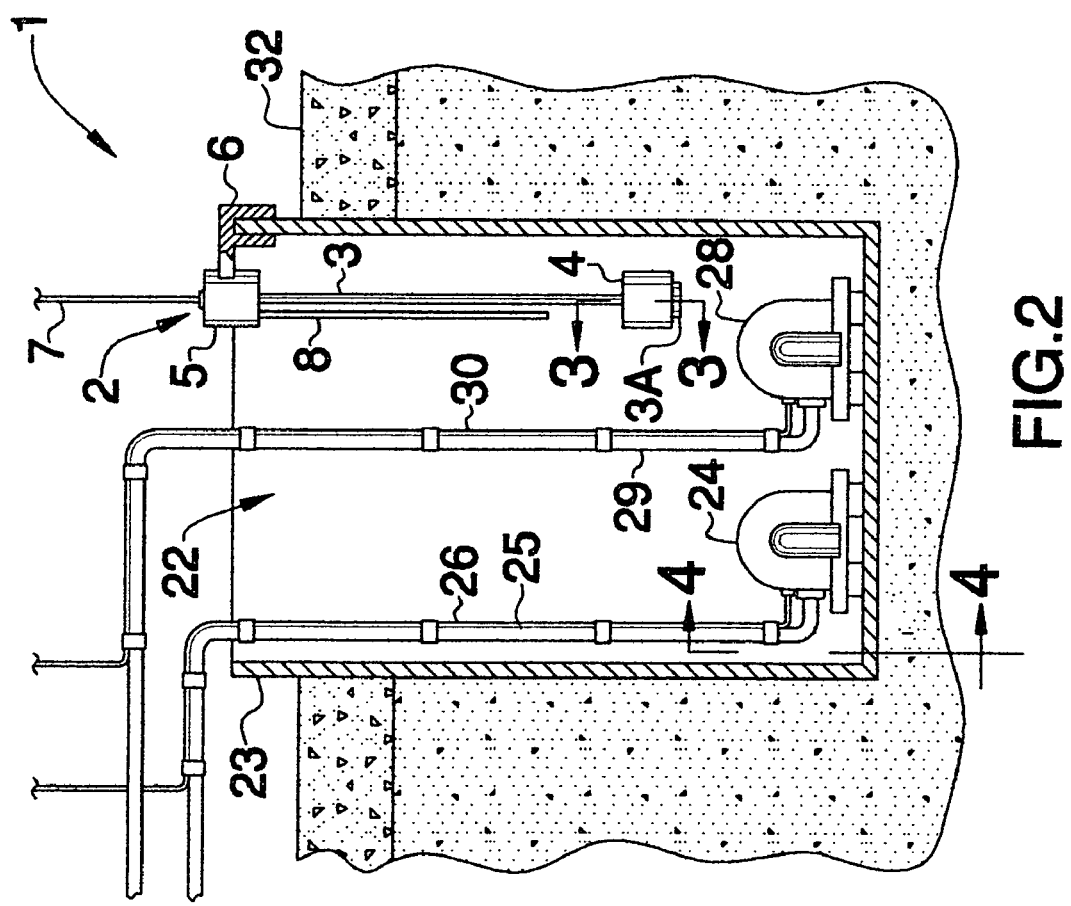
FIG. 2 is a sectional view, taken along section lines 2-2 in FIG. 1, of a sump pit, with a float assembly element of an illustrative embodiment of a flood alarm provided in the sump pit.
Figure 4:
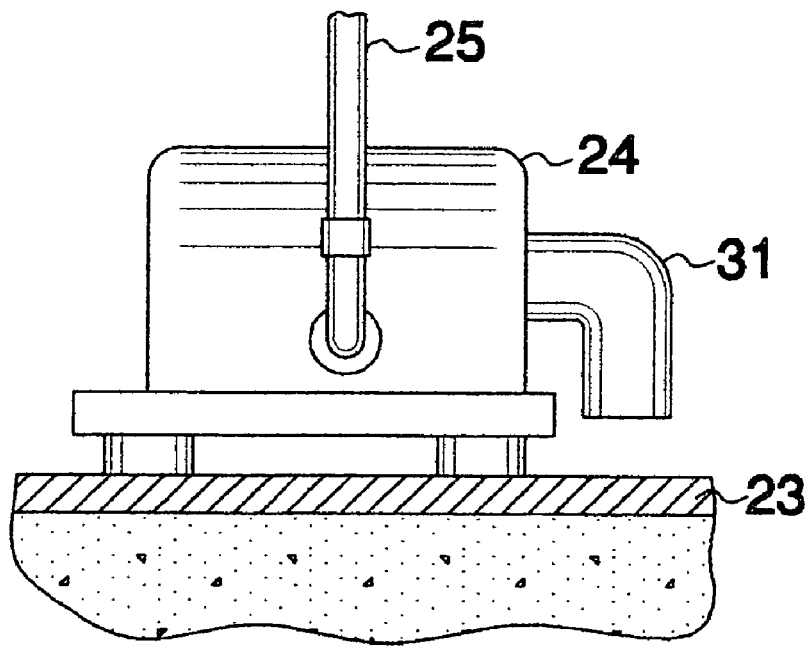
FIG. 4 is a side view of a backup pump, taken along viewing lines 4-4 in FIG. 2, in a sump pit.

Referring to the drawings, an illustrative embodiment of a flood alarm according to the present invention is generally indicated by reference numeral 1. As shown in FIGS. 1 and 2, the flood alarm 1 is adapted to be fitted to a sump pit 22 which is provided in the floor 32 of a structure (not shown) such as a home or business, for example, to collect water in the event of a leakage of water from a water pipe or appliance (not shown), for example. The sump pit 22 may have any structure which is suitable for collecting water from the floor 32 of the structure. For example, as shown in FIG. 2, the sump pit 22 may include a typically plastic, generally cylindrical insert 23 which extends into the floor 32 of the structure. A main pump 24 is provided in the bottom of the insert 23. As shown in FIG. 4, a pump suction 31 may extend from the intake of the main pump 24. A discharge conduit 25 extends from the output of the main pump 24 and is connected to a sewer system (not shown) or other drainage facility. Pump wiring 26 connects the main pump 24 to an electrical power source (not shown). A backup pump 28, typically connected to a discharge conduit 29 and pump wiring 30, may further be provided in the bottom of the insert 23. Accordingly, in the event of a flood in the structure, water collects in the bottom of the insert 23. The main pump 24 and the backup pump 28 normally pump the water from the insert 23; through the discharge conduits 25, 29; and to the sewer system or other drainage facility to prevent flooding of the structure. In the event that the main pump 24 fails, the backup pump 28 continues to pump the water from the insert 23. In the event that both the main pump 24 and the backup pump 28 both fail, however, the level of the water in the insert 23 rises, eventually overflowing the insert 23 and potentially flooding the structure.

Figure 3:
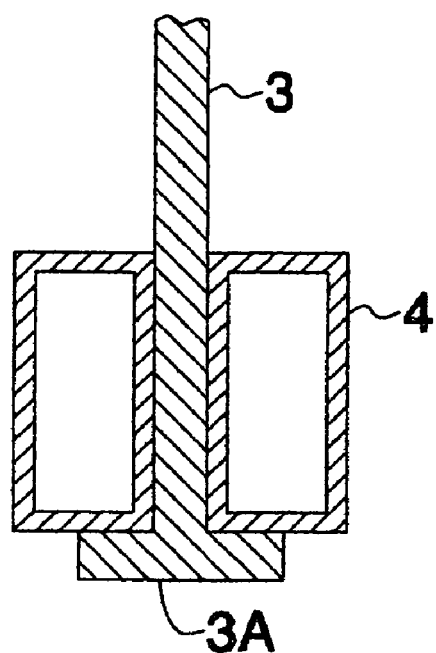
FIG. 3 is a sectional view, taken along section lines 3-3 in FIG. 2.

The flood alarm 1 includes a float assembly 2 which is mounted in the insert 23. The float assembly 2 typically includes a float rod 3 which extends downwardly into the insert 23. For example, the float rod 3 may extend from an alarm cutoff switch 5 to which is attached a rod clip 6 that is adapted to engage the rim of the insert 23 in such a manner that the float rod 3 extends downwardly into the sump pit 22. As shown in FIGS. 2 and 3, a float stop 3a is provided on the lower end of the float rod 3. A buoyant float 4 is slidably mounted on the float rod 3, above the float stop 3a. A sensor rod 8 extends from the alarm cutoff switch 5, adjacent to the float rod 3. Alarm wiring 7 is electrically connected to the float rod 3 and sensor rod 8. Accordingly, the float 4 normally rests on the float stop 3a. In the event of rising water in the insert 23, the float 4 rises on the float rod 3 and eventually contacts the sensor rod 8, establishing electrical contact between the float rod 3 and the sensor rod 8. It is to be understood that the float assembly 2 which was heretofore described serves as just one example of a suitable float assembly which can be used to sense the presence of rising water in the insert 23 and activating the telephone system interface module 10, and that float assemblies of alternative design can be used instead for the purpose.

Figure 6:
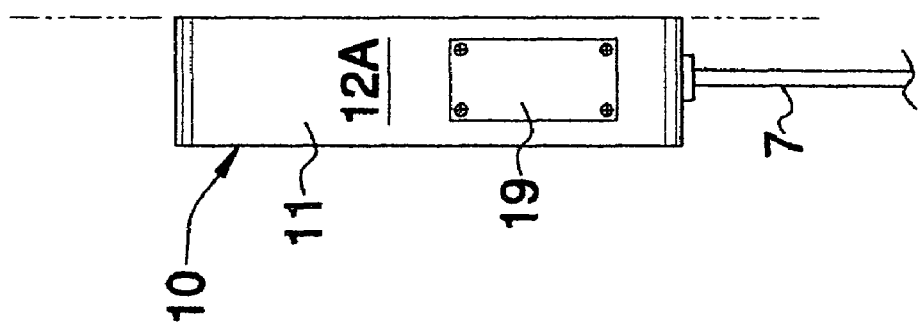
FIG. 6 is a side view of a telephone system interface module of an illustrative embodiment of a flood alarm according to the present invention.
Figure 5:
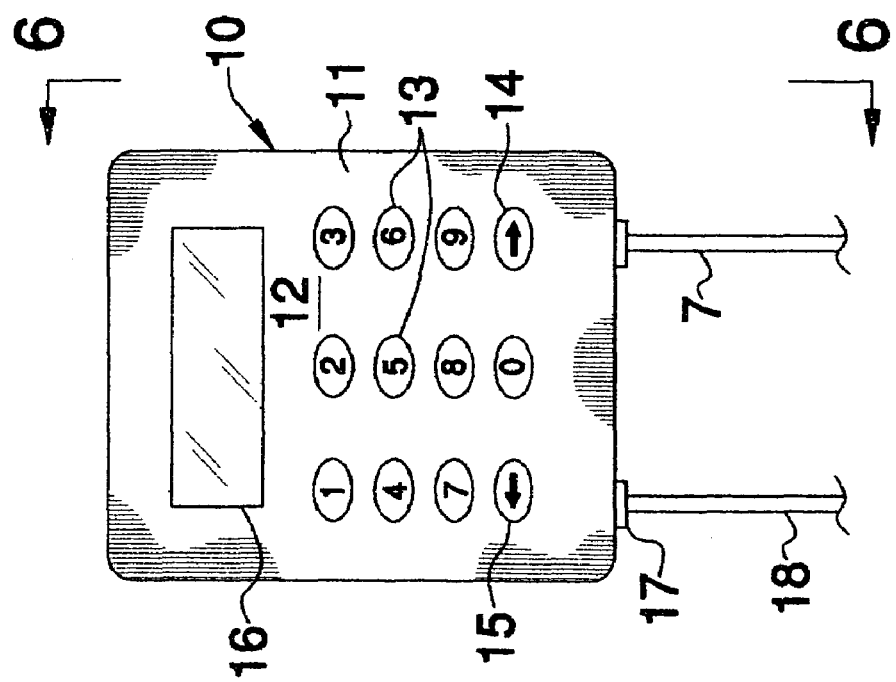
FIG. 5 is a front view of a telephone system interface module of an illustrative embodiment of a flood alarm according to the present invention.

As shown in FIGS. 5 and 6, a telephone system interface module 10 is connected to the alarm wiring 7. The telephone system interface module 10 typically includes a module housing 11 that contains a microprocessor (not shown) having a memory. The module housing 11 typically includes a control panel 12 having numerical buttons 13 which are connected to the microprocessor (not shown) and are adapted to input and store telephone numbers in the microprocessor. A display 16 may be provided on the control panel 12 and connected to the microprocessor. The display 16 is adapted to display telephone numbers as they are entered into the microprocessor using the numerical buttons 13. A forward scroll button 14 and a rearward scroll button 15 may further be provided on the control panel 12 and connected to the microprocessor for scrolling among multiple telephone numbers which are stored in the memory of the microprocessor as the telephone numbers sequentially appear on the display 16. As shown in FIG. 6, a battery cover 19 may be provided on a side panel 12a or other portion of the module housing 11 to cover a battery compartment (not shown) which contains a battery (not shown) in the module housing 11. The microprocessor has the capability to store a recorded message which expresses the flooding status of the structure as indicated by the float assembly 2 in the event of rising water in the insert 23.

A telephone jack 17 is provided on the exterior of the module housing 11 and connected to the microprocessor for connection to a telephone line 18. The telephone line 18 is adapted to be inserted in a telephone jack (not shown) in the structure. Responsive to receiving an activation signal from the float assembly 2 through the alarm wiring 7, due to contact of the float 4 with the sensor rod 8, the microprocessor of the telephone system interface module 10 is adapted to automatically dial the telephone number or numbers stored in the memory of the microprocessor through the telephone line 18. When the possessor of the telephone corresponding to the dialed telephone number answers the telephone, the microprocessor plays the recorded message indicating the flooding status of the structure as indicated by the float assembly 2 of the flood alarm 1. In the event that multiple telephone numbers are programmed into the telephone system interface module 10, the telephone numbers may be sequentially dialed and the recording played to the possessors of the telephones which correspond to the dialed telephone numbers.

In typical operation of the flood alarm 1, at least one telephone number is initially programmed into the telephone system interface module 10. The telephone number may be, for example, that of the cell phone, home phone or work phone of the owner of the structure in which the flood alarm 1 is installed. In the event of a flood in the structure, water enters the insert 23 of the sump pit 22. Normally, the main pump 24 and backup pump 28 pump the water from the insert 23; through the discharge conduits 25, 29, respectively; and discharged to the sewer or other drainage system. In the event that the main pump 24 fails, the backup pump 28 continues to pump water from the insert 23 to prevent flooding of the structure.

In the event that both the main pump 24 and the backup pump 28 both fail, the water rises in the insert 23. This causes the float 4 of the float assembly 2 to rise on the float rod 3, eventually causing the float 4 to contact the sensor rod 8. Therefore, the float 4 establishes electrical contact between the float rod 3 and the sensor rod 8, thereby causing the transmission of an activation signal from the float assembly 2, through the alarm wiring 7 and to the telephone system interface module 10. In response, the telephone system interface module 10 dials the telephone number or numbers which were previously programmed into the telephone system interface module 10. In the event that a possessor of a telephone which corresponds to a dialed telephone number answers the telephone, the telephone system interface module 10 plays the pre-recorded message which indicates the flooding status of the sump pit 22. Therefore, the person can take corrective action at the structure to prevent further flooding of the structure. The telephone system interface module 10 can be inactivated to prevent further telephone calling by the telephone system interface module 10 using the alarm cutoff switch 5.

While the preferred embodiments of the invention have been described above, it will be recognized and understood that various modifications can be made in the invention and the appended claims are intended to cover all such modifications which may fall within the spirit and scope of the invention.

What is claimed is:

1. A flood alarm, comprising:
   a float assembly; and
   a telephone system interface module connected to said float assembly;
   said float assembly comprises a rod clip, a float rod carried by said rod clip and a float carried by said float rod and wherein said telephone system interface module is connected to said float rod; and
   a sensor rod connected to said telephone system interface module and extending adjacent to said float rod for activating said telephone system interface module when said float contacts said sensor rod.

2. The flood alarm of claim 1 further comprising an alarm cutoff switch connected to said float rod and said sensor rod.

3. The flood alarm of claim 1 wherein said telephone system interface module comprises a module housing and a plurality of numerical buttons provided on said module housing.

4. The flood alarm of claim 3 further comprising a display provided on said module housing.

5. The flood alarm of claim 4 further comprising a forward scroll button and a rearward scroll button provided on said module housing.

* * * * *